US006854949B2

(12) United States Patent
Huang

(10) Patent No.: US 6,854,949 B2
(45) Date of Patent: Feb. 15, 2005

(54) REFUSE COLLECTION VEHICLE WITH PENDULAR PACKING DEVICE AND REFUSE EJECTION SYSTEM

(75) Inventor: Simon Huang, Medicine Hat (CA)

(73) Assignee: Wittke Inc., Medicine Hat ( * ) Notice: Subject to any disclaimer, the term of this patent is extended or adjusted under 35 U.S.C. 154(b) by 170 days.

(21) Appl. No.: 10/134,570

(22) Filed: Apr. 30, 2002

(65) Prior Publication Data

US 2003/0202870 A1 Oct. 30, 2003

(51) Int. Cl.[7] .................................................. B60P 1/00
(52) U.S. Cl. ............... 414/525.2; 414/492; 414/525.52; 414/525.6; 414/517
(58) Field of Search .............................. 414/525.2, 492, 414/511, 517, 525.5, 525.52, 525.6

(56) References Cited

U.S. PATENT DOCUMENTS

| | | |
|---|---|---|
| 2,826,318 A | 3/1958 | Beasley |
| 3,325,024 A | 6/1967 | Shubin |
| 3,370,525 A | 2/1968 | Bowles |
| 3,802,585 A | 4/1974 | Churchman |
| 3,865,260 A | 2/1975 | Wieschel et al. |
| 4,877,366 A | 10/1989 | De Filippi |
| 4,948,323 A | 8/1990 | Gasparini |
| 5,067,868 A | 11/1991 | Boda |
| 5,288,196 A | 2/1994 | Horning et al. |
| 5,324,161 A | 6/1994 | Thobe |
| 5,427,496 A | 6/1995 | Ratledge, Jr. et al. |
| 5,513,942 A | 5/1996 | Pickrell |
| 5,551,824 A | 9/1996 | Zanzig et al. |
| 5,584,642 A | 12/1996 | Huntoon |
| 5,857,822 A | 1/1999 | Christenson |
| 5,931,628 A | 8/1999 | Christenson |
| 6,007,291 A | 12/1999 | Ghibaudo |
| 6,149,079 A | 11/2000 | Kinkead et al. |

*Primary Examiner*—Dean J. Kramer
*Assistant Examiner*—Michael Lowe
(74) *Attorney, Agent, or Firm*—Anissimoff & Associates

(57) ABSTRACT

A refuse collection vehicle having a vehicle chassis including a vehicle cab and frame with a vehicle body mounted on top of the frame. The vehicle body has a front receiving hopper separated from a rear storage compartment by means of a partition having an aperture for passage of refuse. A pendular packing device having a refuse engaging face is pivotally mounted within the receiving hopper and arcuately swings to rapidly transfer refuse through the aperture. In order to empty the storage compartment, a rear door is opened to permit egress of refuse and the partition moves longitudinally along the vehicle body to displace refuse out of the storage compartment.

18 Claims, 8 Drawing Sheets

REFUSE COLLECTION VEHICLE WITH PENDULAR PACKING DEVICE AND REFUSE EJECTION SYSTEM

BACKGROUND OF THE INVENTION

1. Field of the Invention

The invention relates to refuse collection vehicles, particularly refuse collection vehicles equipped with pendular packing devices capable of ejecting stored refuse from the rear of the vehicle body.

2. Description of the Prior Art

Refuse collection vehicles normally have a vehicle chassis consisting of a frame with front and rear sets of wheels, a cab for housing the vehicle operator, and an engine for powering the vehicle's hydraulic system and rear wheels. The cab is mounted atop the frame at the front end and a vehicle body is located rearward of the cab and longitudinally aligned with the frame.

The vehicle body has a receiving hopper into which refuse is deposited. The receiving hopper has a partition separating it from a storage compartment immediately rearward of the receiving hopper. The storage compartment normally includes a roof, two sides, a floor, and at least one rear door that may be opened to permit egress of stored refuse. The partition includes an aperture for passage of refuse from the receiving hopper to the storage compartment.

Refuse may be transferred through the aperture in at least two ways. One way is by longitudinally sliding a packing device positioned at the front of the receiving hopper towards the rear of the vehicle so that a refuse engaging face of the packing device pushes the refuse through the aperture into the storage compartment. Another way is by using a pendular packing device pivotally mounted within the receiving hopper that arcuately swings from a raised position to a lower position towards the rear of the receiving hopper. The receiving hopper floor is normally curved to correspond to the arc of the pendular packing device and a refuse engaging face of the packing device transfers the refuse through the aperture. Since the transfer of refuse is aided by gravity and since this type of packing device is typically equipped with low-volume, fast-acting hydraulic cylinders, refuse can be transferred to the storage compartment at a faster rate than with a conventional sliding packing device, which usually increases the overall efficiency of refuse collection. Also, sliding packing devices have load bearing surfaces in contact with one another that are prone to wear and accordingly have increased maintenance cost as compared with pendular packing devices.

To empty waste from the storage compartment, for example at a landfill site, refuse collection vehicles are typically equipped with a vehicle body tilting mechanism. The vehicle body is normally attached to the rear of the vehicle frame by means of a hinge and a hydraulic lifting cylinder is provided to raise the front end of the vehicle body. Refuse is then permitted to downwardly slide from the storage compartment through the open rear door. Raising the vehicle body places the vehicle in a precarious and unsafe position, especially on the uneven terrain frequently encountered at a landfill site. Also, there is a risk of contact with overhead obstacles, such as electrical wires. The lifting cylinder is expensive and it is time consuming to raise the vehicle body.

To address these concerns, some refuse collection vehicles have recently been equipped with refuse ejection systems. The refuse ejection system employs a sliding packing device typically powered by a pair of telescoping hydraulic cylinders. To eject the refuse, the telescoping cylinders extend the packing device, which engages the rear partition of the receiving hopper and longitudinally slides the partition towards the rear of the vehicle. Refuse is thereby displaced out through the open rear door, obviating the need for the vehicle body tilting mechanism.

Conventional refuse ejection systems employ the sliding packing device, with the inherent wear problems previously described. In addition, a pair of telescoping cylinders is typically provided, which increases vehicle cost and maintenance. Due primarily to their large volume, telescoping cylinders are inherently slow acting as compared with low volume cylinders, exacerbating the problem of slow transfer of refuse from the receiving hopper to the storage compartment normally experienced with sliding packing devices.

To increase collection efficiency, refuse vehicles are sometimes equipped with automated container loaders for depositing refuse within the vehicle body. Though these devices may increase the rate at which individual containers may be loaded, the overall collection efficiency is often limited by how quickly the deposited refuse can be transferred from the receiving hopper to the storage compartment.

The present invention seeks to overcome the disadvantages of sliding packing devices and vehicle body tilting mechanisms by providing a low cost, minimal maintenance system for rapidly transferring refuse from the receiving hopper to the storage compartment of a refuse collection vehicle that may be advantageously employed in conjunction with an automated container loader to increase the overall efficiency of refuse collection.

SUMMARY OF THE INVENTION

According to an aspect of the invention, there is provided a refuse collection vehicle body having a rear and a front. The vehicle body has at its rear a refuse storage compartment having a rear door operable to open to permit egress of refuse and at its front a refuse receiving hopper. The receiving hopper has a substantially vertical rear partition located forward of the storage compartment and separating the receiving hopper from the storage compartment. The rear partition has an aperture for passage of the refuse to the storage compartment. A pendular packing device is pivotally mounted within the receiving hopper. The packing device has a refuse engaging face and is operable to arcuately swing, thereby transferring the refuse to the storage compartment through the aperture. The rear partition is operable to longitudinally slide toward the rear door of the storage compartment, thereby displacing the refuse in the storage compartment out through the door.

According to another aspect of the invention, there is provided a refuse collection vehicle comprising: a vehicle frame having front and rear sets of road engaging wheels mounted thereunder and motive means for rotating at least one of the sets of wheels; a vehicle cab mounted on the vehicle frame; and, a vehicle body having a rear and a front longitudinally mounted on the vehicle frame rearward of the vehicle cab. The vehicle body has at its rear a refuse storage compartment having a rear door operable to open to permit egress of refuse and at its front a refuse receiving hopper. The receiving hopper has a substantially vertical rear partition located forward of the storage compartment and separating the receiving hopper from the storage compartment. The rear partition has an aperture for passage of the refuse to the storage compartment. A pendular packing device is pivotally mounted within the receiving hopper. The packing device has a refuse engaging face and is operable to arcuately swing, thereby transferring the refuse to the storage compartment through the aperture. The rear partition is operable to longitudinally slide toward the rear door of the storage compartment, thereby displacing the refuse in the storage compartment out through the door.

According to yet another aspect of the invention, there is provided a refuse collection vehicle comprising: a vehicle frame having front and rear sets of road engaging wheels mounted thereunder and motive means for rotating at least one of the sets of wheels; a vehicle cab mounted on the vehicle frame; and, a vehicle body having a rear and a front longitudinally mounted on the vehicle frame rearward of the vehicle cab. The vehicle body has at its rear a refuse storage compartment having a rear door operable to open to permit egress of refuse and at its front a refuse receiving hopper. The receiving hopper has a substantially vertical rear partition with substantially the same width and height as the interior of the storage compartment located forward of the storage compartment and separating the receiving hopper from the storage compartment. The rear partition has an aperture for passage of the refuse to the storage compartment. A pendular packing device is pivotally mounted within the receiving hopper and has a refuse engaging face. The device is operable to arcuately swing, thereby transferring the refuse to the storage compartment through the aperture and has at least one swing member having an upper end and a lower end. The upper end of the swing member is pivotally mounted at substantially the top of the rear partition. The refuse engaging face is attached to the lower end of the swing member and adapted to block the aperture to prevent passage of the refuse from the storage compartment to the receiving hopper. The aperture is located at substantially the bottom of the rear partition. The receiving hopper is operable to longitudinally slide toward the rear door of the storage compartment, thereby displacing the refuse in the storage compartment out through the door.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

PREFERRED EMBODIMENT

Figure 1:
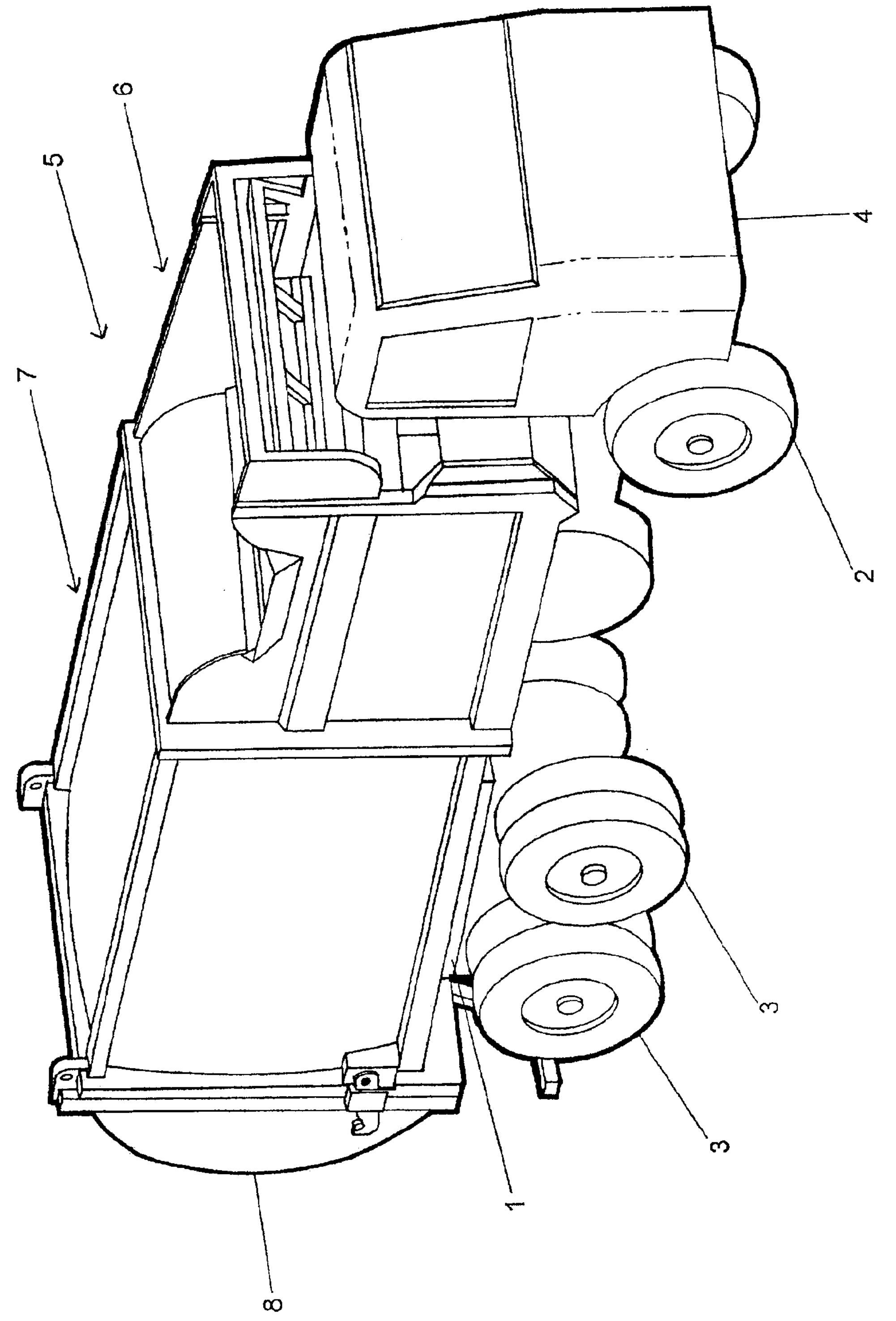
FIG. 1 is a perspective view of a refuse vehicle.

A refuse collection vehicle is generally illustrated in FIG. 1. The vehicle chassis includes a frame 1 having front and rear sets of wheels 2 and 3 and a vehicle cab 4 at the front of the frame. The cab 4 houses the vehicle operator and vehicle controls (not shown). An engine (not shown) is typically mounted to the frame 1 at the front of the vehicle for powering the vehicle hydraulic system and for rotating at least one of the sets of rear wheels 3. A vehicle body 5 is mounted on top of the frame 1 rearward of the cab 4. The vehicle body 5 includes a receiving hopper 6 into which refuse is deposited for subsequent transfer to a storage compartment 7. The receiving hopper 6 is shown with openings in its top and side through which refuse may be deposited by an automated container loader (not shown). A refuse collection vehicle may also have openings in the side of the receiving hopper 6 (not shown) to permit manual side loading of refuse from residential waste containers. The storage compartment 7 has at least one rear door 8 that is operable to open to permit egress of stored refuse, such as at a landfill site, preferably using hydraulic cylinders.

Figure 2:
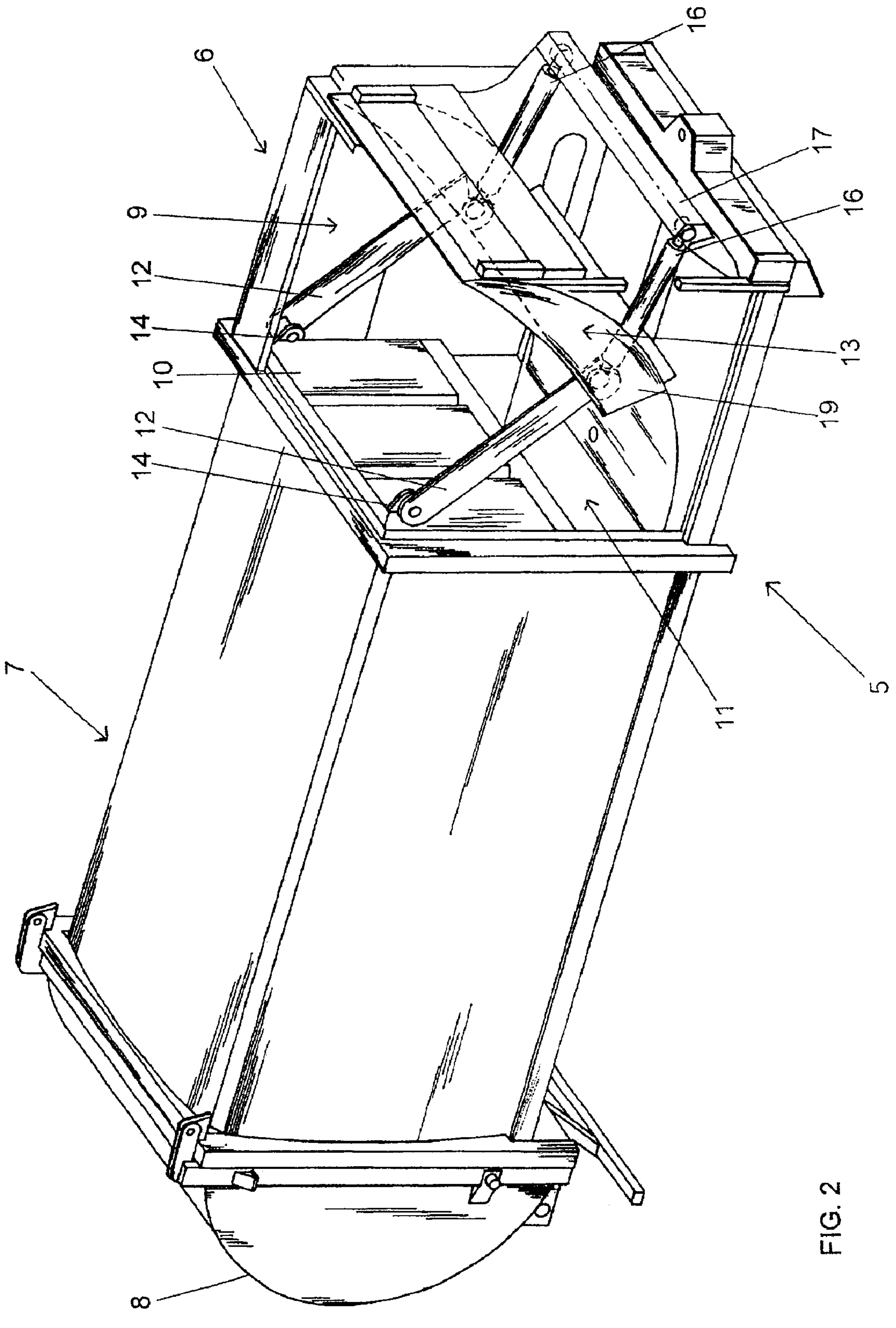
FIG. 2 is a perspective view of a refuse vehicle body with a pendular packing device in the raised position.
Figure 3:
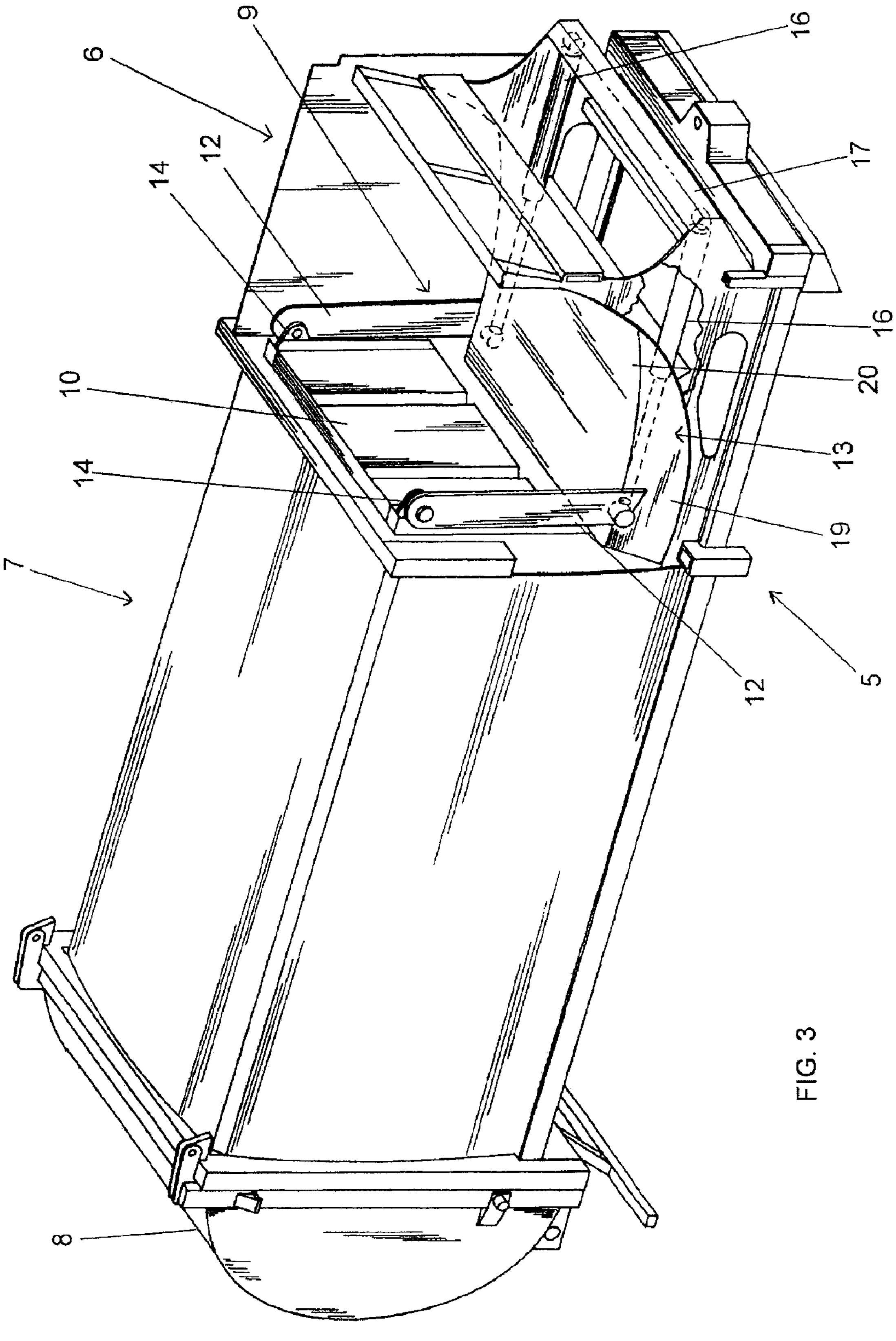
FIG. 3 is a perspective view of a refuse vehicle body with a pendular packing device in the lowered position.
Figure 4:
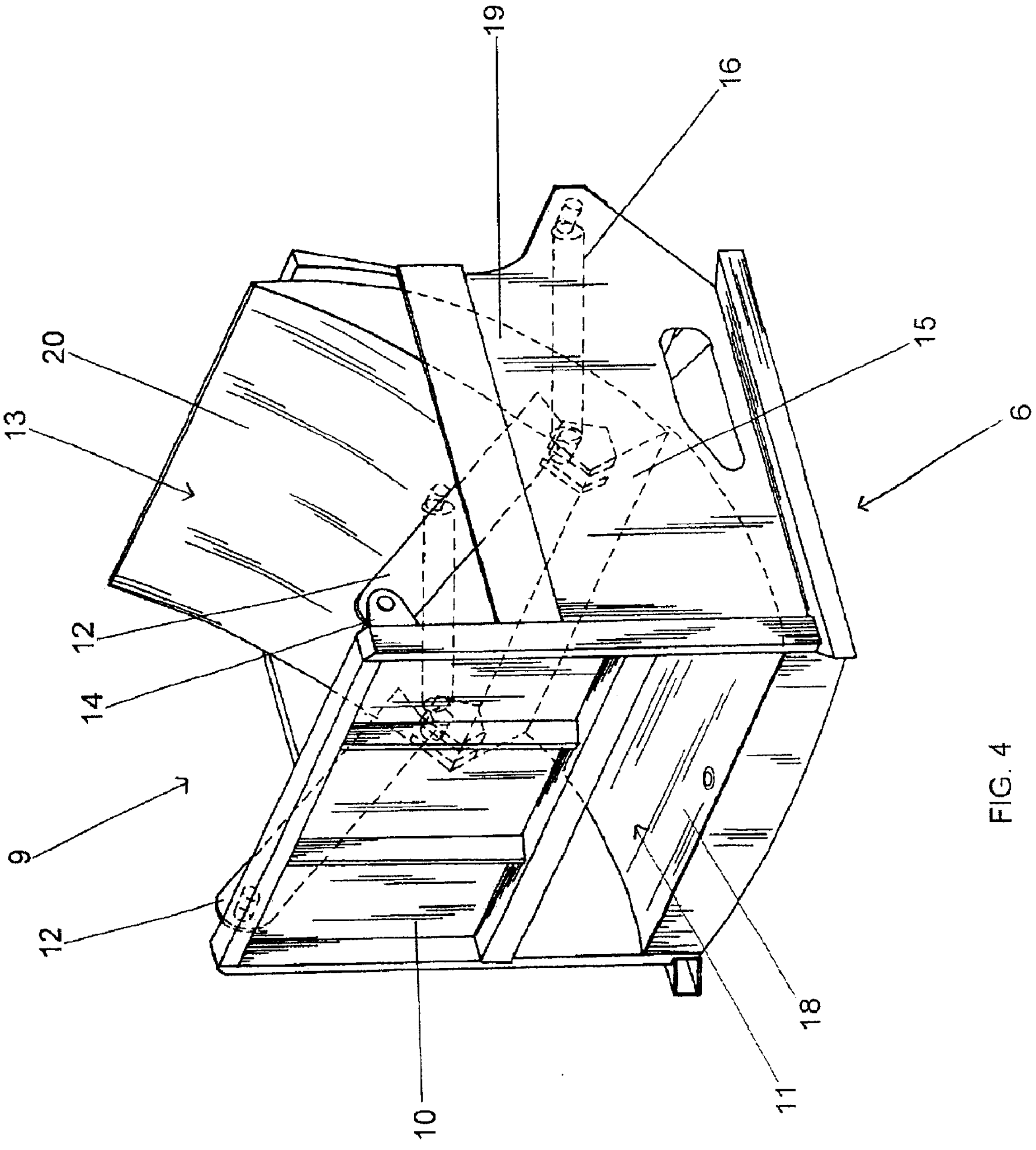
FIG. 4 is a perspective view of a refuse receiving hopper with a pendular packing device.

Referring to FIGS. 2, 3 and 4, a pendular packing device 9 is shown within the receiving hopper 6. The receiving hopper 6 has a rear partition 10 that separates the receiving hopper from the storage compartment 7. The partition 10 has an aperture 11 for passage of refuse from the receiving hopper 6 to the storage compartment 7. The pendular packing device 9 is operable to arcuately swing, thereby transferring refuse through the aperture 11.

The packing device 9 includes a pair of swing members 12 and a refuse transfer head 13. The upper end of each swing member 12 is pivotally attached to the vehicle body 5, for example, by means of a bracket 14 at substantially the top of the rear partition 10. The bracket 14 may include bearings (not shown) to facilitate pivoting movement of the swing member 12. The lower end of each swing member 12 is attached to the refuse transfer head 13, which has a refuse engaging face 15 oriented towards the rear of the vehicle. A hydraulic cylinder 16 is pivotally attached at one end to each swing member 12. The opposite end is attached to a portion of the vehicle body 5, such as a horizontal cross member 17 at the front of the receiving hopper 6. To operate the packing device 9, the cylinders 16 are extended, causing the refuse engaging face 15 to arcuately swing downwardly and rearwardly, thereby transferring refuse resting on the receiving hopper floor 18 into the storage compartment 7 through the aperture 11. In order that the majority of refuse is removed from the receiving hopper 6, the transfer head 13 includes side 19 and top 20 surfaces to prevent refuse from falling behind the face 15 and the receiving hopper floor 18 is curved to correspond with the arc followed by the packing device 9. Retraction of the cylinders 16 causes the transfer head 13 to swing in the opposite direction, thereby readying the receiving hopper 6 for the next deposit of refuse.

To empty the contents of the storage compartment 7, for example at a landfill site, a refuse ejection system may be employed where the rear door 8 is opened and the rear partition 10 is moved longitudinally towards the rear of the vehicle body 5. The movement of the rear partition 10 causes the volume of the storage compartment 7 to decrease, thereby displacing refuse from the storage compartment out through the open rear door 8 and eliminating the need for a vehicle body tilting mechanism.

Figure 5:
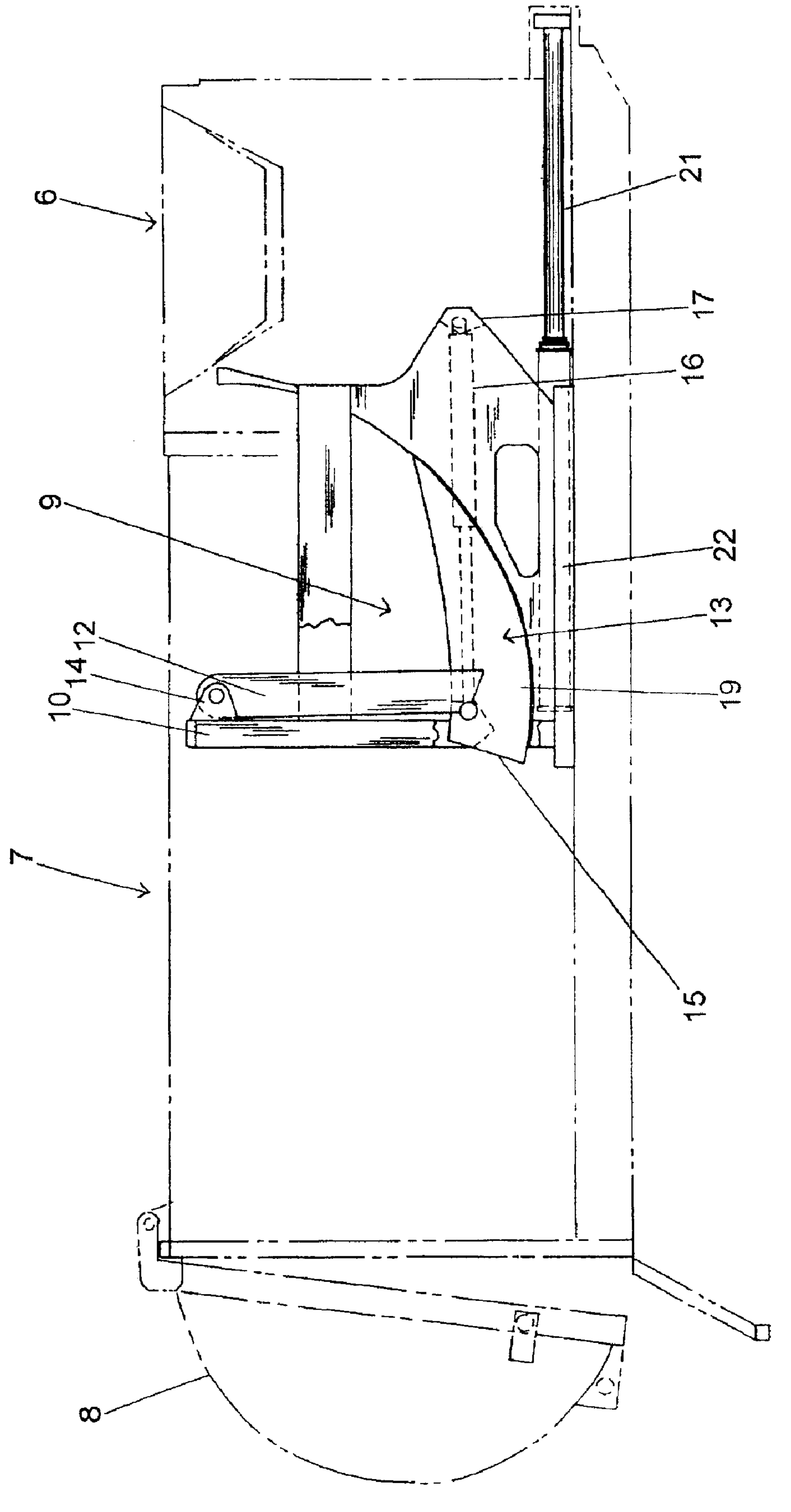
FIG. 5 is a side view of a first embodiment of a refuse vehicle body during ejection of refuse.
Figure 6:
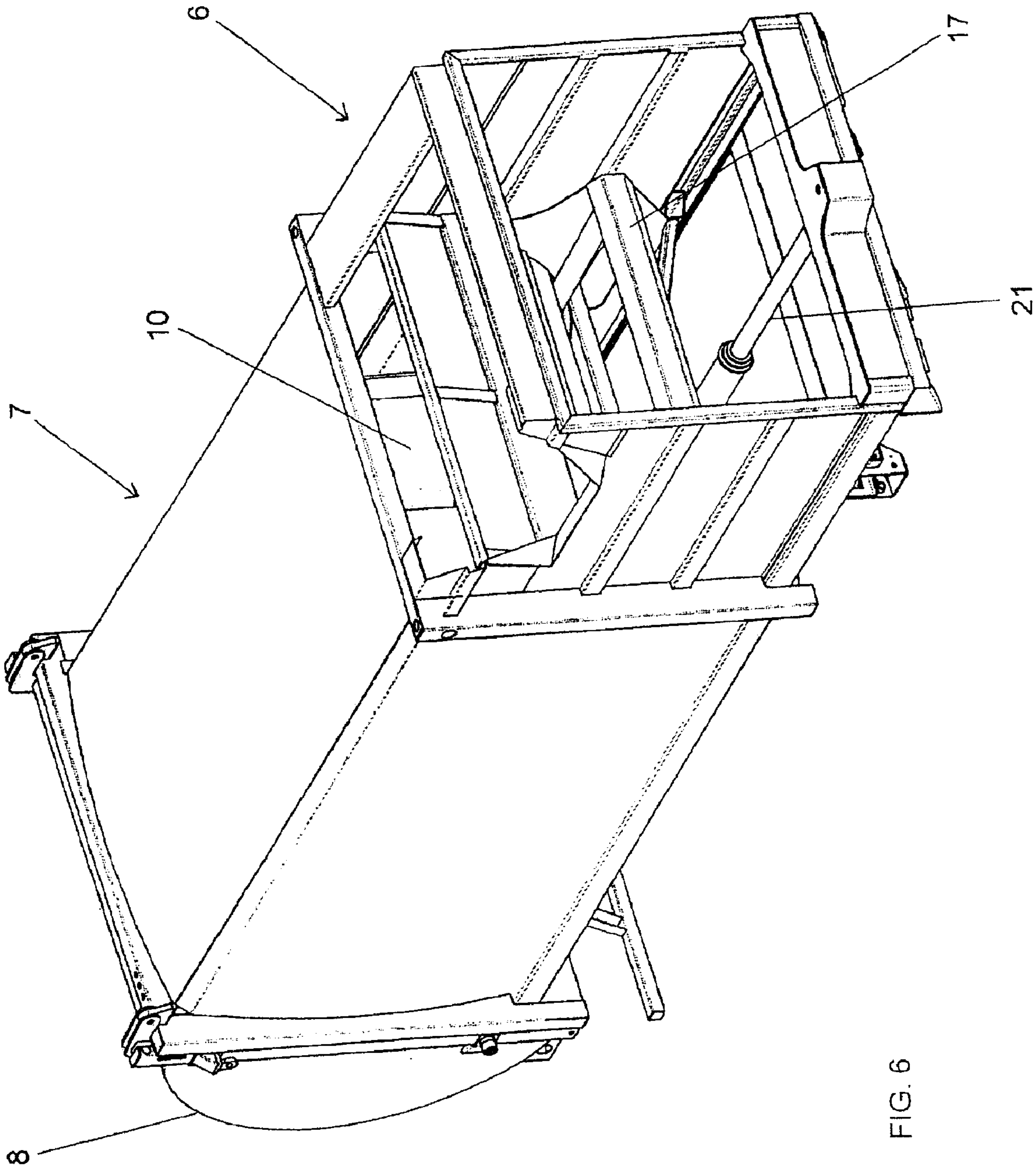
FIG. 6 is a perspective view of a first embodiment of a refuse vehicle body during ejection of refuse.

Referring to FIGS. 5 and 6, in a first embodiment the longitudinal movement is created by extension of a telescoping cylinder 21 that may be attached, for example, at one end to the front of the vehicle body 5 and at the other end to the underside of the receiving hopper floor 18. Rails 22 along the bottom of the receiving hopper 6 may be provided that correspond to slots (not shown) along the bottom of the storage compartment 7 and lubricated, for example by a low friction solid material such as Delrin™ or any other suitable material, to facilitate longitudinal sliding movement of the receiving hopper.

Figure 7:
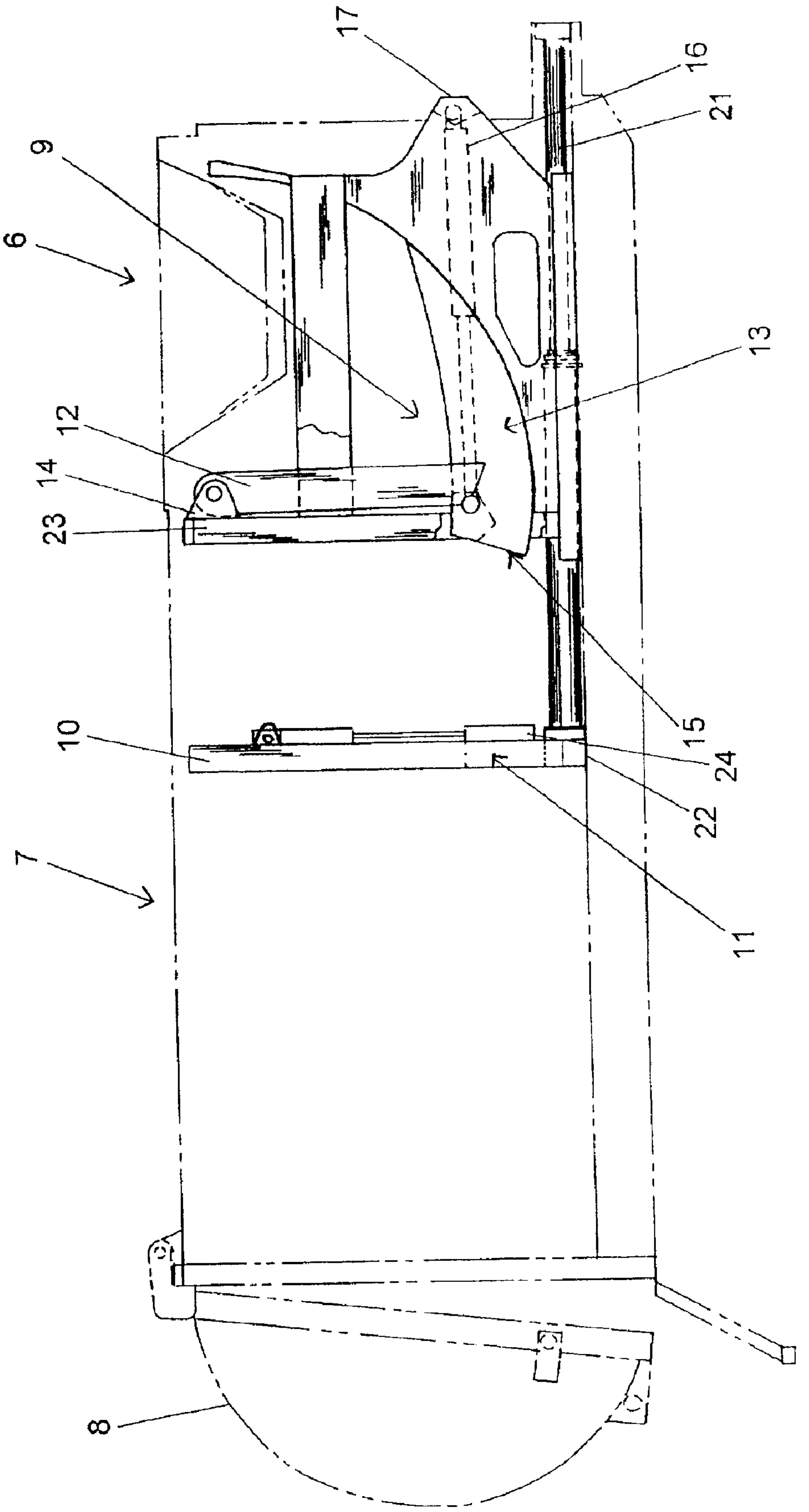
FIG. 7 is a side view of a second embodiment of a refuse vehicle body during ejection of refuse.

Referring to FIG. 7, in a second embodiment both the cylinder 21 and rails 22 are attached to the underside of the rear partition and only the rear partition 10 slides. The partition 10 may, for example, abut against the rear face of an inwardly extending frame 23 along the sides of the vehicle body 5 and the brackets 14 may be attached to the front face of the inwardly extending frame near the top of the rear partition. The inwardly extending frame may also be attached to the receiving hopper floor 18. The rear partition 10 may therefore slide rearwardly independently of the remainder of the receiving hopper 6 in order to eject refuse from the storage compartment 7.

To prevent refuse from passing back into the receiving hopper 6 through the aperture 11 upon sliding of the rear partition 10, the packing device 9 may be placed in the lowered position so that the refuse engaging face 15 blocks the aperture. The packing device 9 then moves with the rear partition 10 as the entire receiving hopper 6 longitudinally slides along the vehicle body 5, thereby preventing transfer of refuse back into the receiving hopper. Alternatively, a gate 24 may be provided to block the aperture 11, which is especially useful in the second embodiment. The gate 24 may be, for example, hydraulically operated and designed to vertically slide along the rear partition 10. The packing device 9 and gate 24 may also be advantageously employed cooperatively in either embodiment to prevent "spring back" of refuse from the storage compartment 7 to the receiving hopper 6 following each individual refuse transfer operation.

Figure 8:
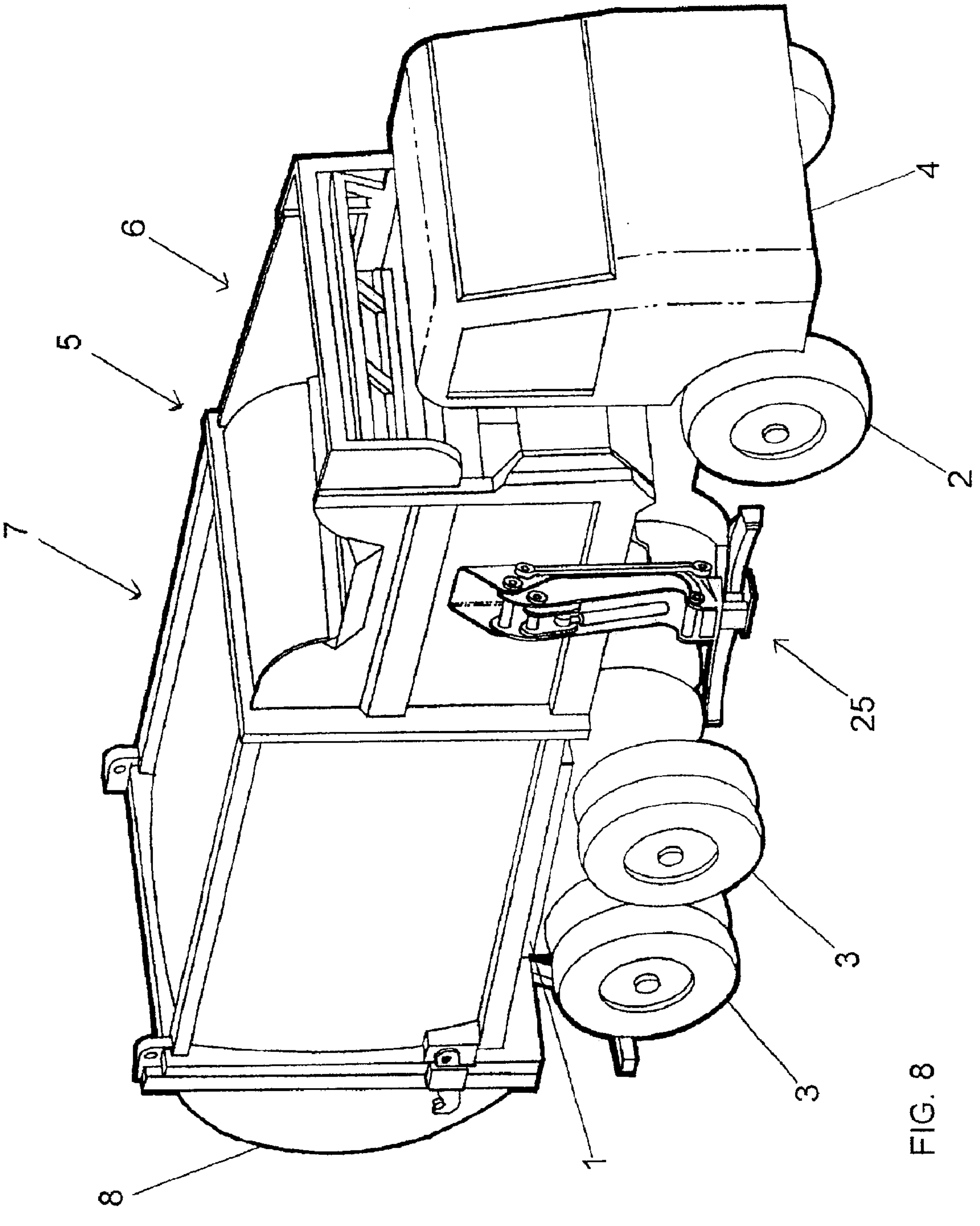
FIG. 8 is a perspective view of a refuse collection vehicle with an automated container loader adjacent the side of the vehicle.

Turning to FIG. 8, a refuse collection vehicle is shown with an automated container loader 25 adjacent the side of the receiving hopper 6. The automated container loader 25 shown is of a type used to retrieve curbside residential waste containers. An alternative type of automated container loader (not shown) may be positioned adjacent the front of the vehicle to retrieve a bulk commercial refuse container. Using the automated container loader 25, a refuse container may be raised and downwardly tilted to deposit its contents through the top and/or side openings into the receiving hopper 6. Automated container loaders are used to promote the efficiency of refuse vehicle operation by increasing collection speed while reducing labour requirements. The present invention may be advantageously employed in conjunction with an automated container loader to minimize the potential for a bottleneck in transferring refuse caused by an increase in refuse collection speed. As previously described, the present invention employs gravity and fast-acting hydraulic cylinders to rapidly transfer refuse from the receiving hopper 6 to the storage compartment 7 in a vehicle equipped with a refuse ejection system. This is in contrast to other vehicles equipped with refuse ejection systems that employ sliding packing devices utilizing a pair of telescoping cylinders, which are inherently slower to extend and more expensive to maintain than the simple cylinders employed in the present invention. The potential for increased efficiency afforded by the automated container loader 25 is accordingly realized in a vehicle equipped with a refuse ejection system through the rapid refuse transfer provided by the pendular packing device 9.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A refuse collection vehicle body having a rear and a front, comprising:

a refuse storage compartment at the rear of the vehicle body having no front wall, but having a rear wall, two side walls, a floor and an interior cross-section, and having a rear door in the rear wall operable to open to permit egress of refuse;

a refuse receiving hopper at the front of the vehicle body having a front wall, rear wall, two side walls and a floor separate from the rear wall, side walls and floor of the storage compartment, the rear wall of the receiving hopper profiled to match the interior cross-section of the storage compartment and having an aperture for passage of refuse to the storage compartment, the entire receiving hopper operable to longitudinally move within the storage compartment toward the rear door of the storage compartment to thereby displace refuse in the storage compartment out through the rear door;

a pendular packing means pivotally mounted to the receiving hopper having a refuse engaging face, the packing means operable to arcuately swing within the receiving hopper, thereby transferring refuse to the storage compartment through the aperture; and, a hydraulic cylinder located below the floor of the receiving hopper for longitudinally moving the entire receiving hopper within the storage compartment.

2. The refuse collection vehicle body of claim 1, wherein the floor of the receiving hopper is curved to correspond to the arcuate swing of the packing means in the receiving hopper.

3. The refuse collection vehicle body of claim 1, wherein the aperture is located at substantially the bottom of the rear wall of the receiving hopper.

4. The refuse collection vehicle body of claim 1, wherein the floor of the receiving hopper comprises rails attached to an underside thereof to facilitate longitudinal sliding of the receiving hopper within the storage compartment.

5. The refuse collection vehicle body of claim 1, wherein the pendular packing means comprises a swing member having an upper end pivotally attached to the hopper at a top thereof, and a lower end to which the refuse engaging face is attached.

6. The refuse collection vehicle body of claim 1, wherein the refuse engaging face of the pendular packing means blocks the aperture when the pendular packing means is in a lowered position to prevent passage of refuse from the storage compartment into the receiving hopper.

7. The refuse collection vehicle body of claim 1, wherein the rear wall of the receiving hopper further comprises a refuse blocking gate to prevent passage of refuse from the storage compartment into the receiving hopper.

8. The refuse collection vehicle body of claim 1, wherein the packing means is operable by means of a hydraulic cylinder, one end of the hydraulic cylinder attached to the front wall of the receiving hopper at substantially a top thereof and another end of the hydraulic cylinder attached to the packing means proximal the refuse engaging face.

9. A refuse collection vehicle comprising:

(a) a vehicle frame having front and rear sets of road engaging wheels mounted thereunder and motive means for rotating at least one of the sets of wheels;

(b) a vehicle cab mounted on the vehicle frame; and, (c) a vehicle body having a rear and a front longitudinally mounted on the vehicle frame rearward of the vehicle cab, the vehicle body comprising a refuse storage compartment at the rear of the vehicle body having no front wall, but having a rear wall, two side walls, a floor and an interior cross-section, and having a rear door in the rear wall operable to open to permit egress of refuse, a refuse receiving hopper at the front of the vehicle body having a front wall, rear wall, two side walls and a floor separate from the rear wall, side walls and floor of the storage compartment, the rear wall of the receiving hopper profiled to match the interior cross-section of the storage compartment and having an aperture for passage of refuse to the storage compartment, the entire receiving hopper operable to longitudinally move within the storage compartment toward the rear door of the storage compartment to thereby displace refuse in the storage compartment out through the rear door, a pendular packing means pivotally mounted to the receiving hopper having a refuse engaging face, the packing means operable to arcuately swing within the receiving hopper, thereby transferring refuse to the storage compartment through the aperture, and a hydraulic cylinder located below the floor of the receiving hopper for longitudinally moving the entire receiving hopper within the storage compartment.

10. The refuse collection vehicle of the claim 9, wherein the receiving hopper includes a top opening for receiving refuse.

11. The refuse collection vehicle of claim 9, wherein the receiving hopper includes a side opening for receiving refuse.

12. The refuse collection vehicle of claim 9, further comprising an automated container loader for raising a refuse container and downwardly depositing refuse into the receiving hopper.

13. The refuse collection vehicle of claim 9, wherein the floor of the receiving hopper is curved to correspond to the arcuate swing of the packing means in the receiving hopper.

14. The refuse collection vehicle of claim 9, wherein the aperture is located at substantially the bottom of the rear wall of the receiving hopper.

15. The refuse collection vehicle of claim 9, wherein the floor of the receiving hopper comprises rails attached to an underside thereof to facilitate longitudinal sliding of the receiving hopper within the storage compartment.

16. The refuse collection vehicle of claim 9, wherein the pendular packing means comprises a swing member having an upper end pivotally attached to the hopper at a top thereof, and a lower end to which the refuse engaging face is attached.

17. The refuse collection vehicle of claim 9, wherein the refuse engaging face of the pendular packing means blocks the aperture when the pendular packing means is in a lowered position to prevent passage of refuse from the storage compartment into the receiving hopper.

18. The refuse collection vehicle of claim 9, wherein the packing means is operable by means of a hydraulic cylinder, one end of the hydraulic cylinder attached to the front wall of the receiving hopper at substantially a top thereof and another end of the hydraulic cylinder attached to the packing means proximal the refuse engaging face.

* * * * *